Figure 1:
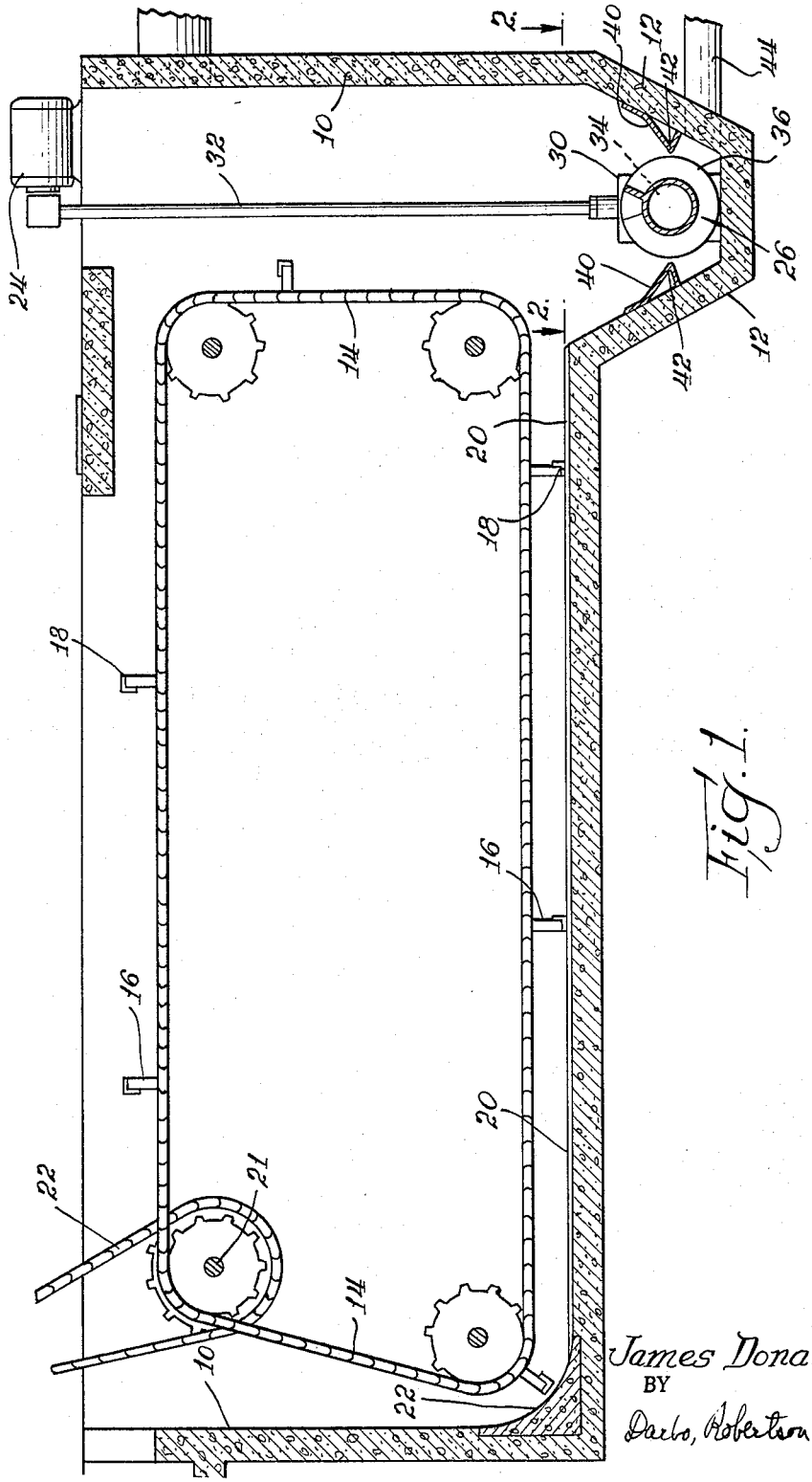

Nov. 15, 1966    J. D. WALKER    3,285,415
SLUDGE COLLECTOR METHOD AND APPARATUS
Filed Aug. 1, 1963    2 Sheets-Sheet 1

INVENTOR.
James Donald Walker
BY
Darbo, Robertson & Vandenburgh
Attys.

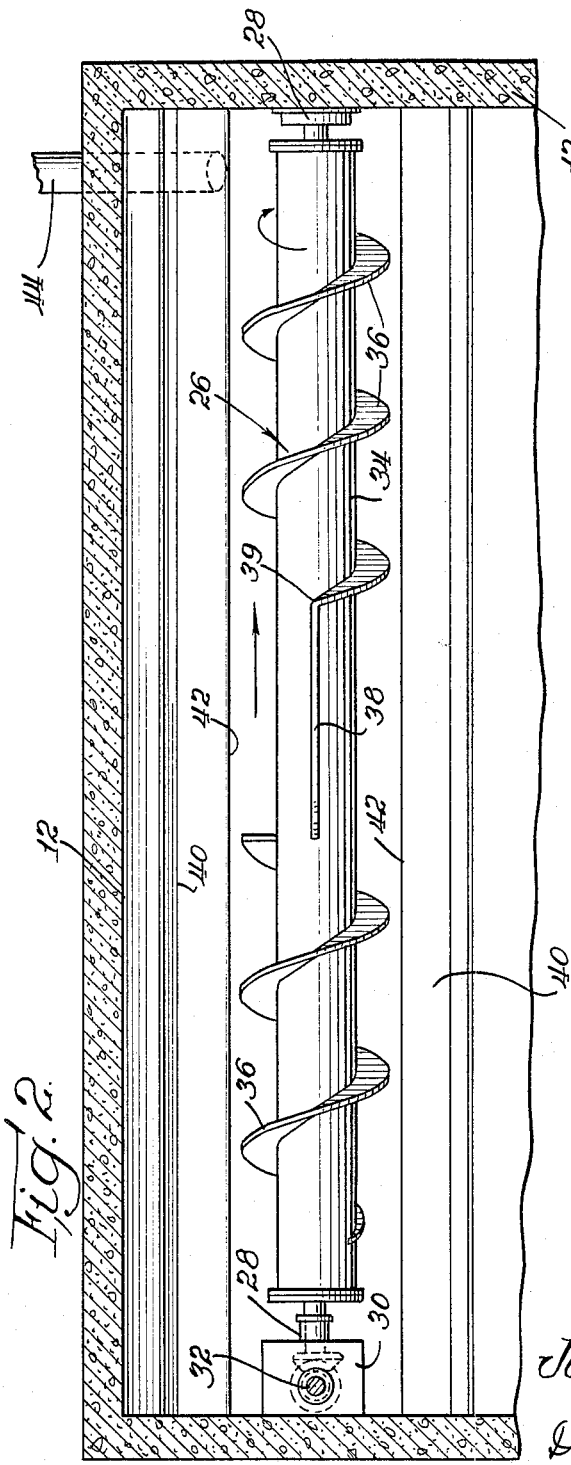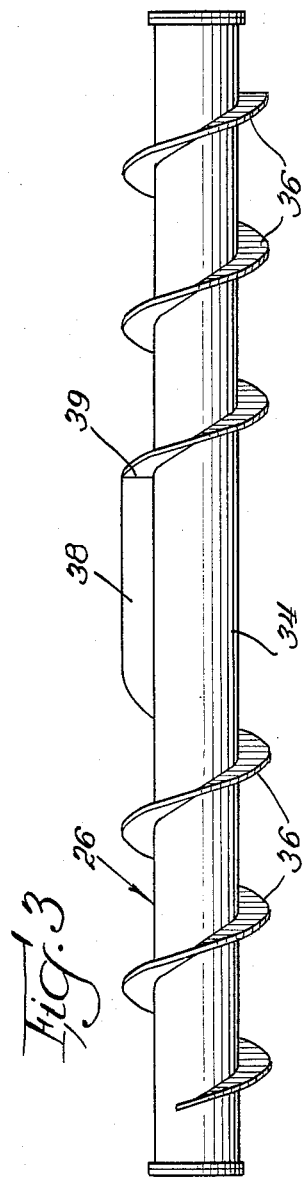

United States Patent Office 3,285,415
Patented Nov. 15, 1966

3,285,415
SLUDGE COLLECTOR METHOD AND APPARATUS
James Donald Walker, Aurora, Ill., assignor to Walker Process Equipment, Inc., Wilmington, Del., a corporation of Delaware
Filed Aug. 1, 1963, Ser. No. 299,245
9 Claims. (Cl. 210—66)

This invention relates particularly to a sludge thickener and cross collector, but is more particularly described as a helicoid conveyer and thickener for cross collectors as used in sludge settling tanks in sewage treatment plants. The following disclosure of this invention is offered for public dissemination if patent protection is secured.

In sewage treatment plants it is desirable to draw from the settling tank a sludge of relatively high density, by which is meant, a relatively high percentage of solids for the given water content. Sludge comprises sewage solids together with at least enough water to make the mixture liquid in nature and capable of being pumped through pipes. Any more than enough water for this purpose is undesirable, as it simply takes up more room, without advantages. Special tanks for thickening the sludge drawn from settling tank hoppers have sometimes been provided, and of course, some thickening may occur in the hoppers.

In the present invention an improved method is provided for speeding up sludge thickening; for reducing the time necessary, and reducing or eliminating the need for additional or separate sludge thickening devices; for utlilizing cross collectors having hoppers below the ordinary tanks, into which the sludge, is swept, and where it is kneaded and worked, as it is propelled to the discharge opening of the hopper; thus improving the efficiency of the thickening action in the hopper and reducing the time necessary to produce an improved result.

Other objects of the invention are, to provide means for additionally thickening sludge with a helicoidal cross collecting device which has a kneading action in a lower collecting trough into which sludge is raked or swept to alternately propel, knead transversely, and propel the sludge in propelling it to an outlet by interrupted helicoidal screws; to provide bars at the sides of the cross thickening trench which are in close clearance to the flights of the helicoidal device to produce and increase frictional treatment of the sludge; and, in general, to increase the sludge thickening action in cross collectors, and to produce a more efficient operation and result thereof.

Still other improved actions and objects of the invention will appear in the specification and will be apparent from the accompanying drawings, in which, FIG. 1 is a longitudinal sectional view of a sludge receiving tank with a deeper hopper or cross trough at the one end, in which a helicoidal thickening and feeding device is rotatable, in accordance with the invention;

FIG. 2 is a fragmentary horizintal sectional view taken approximately along the line 2—2 of FIG. 1 and looking down on the helicoidal device shown in vertical section in FIG. 1; and FIG. 3 is a side view of the device shown in FIG. 2.

Although the following disclosure offered for public dissemination is detailed to ensure adequacy and aid understanding, this is not intended to prejudice that purpose of a patent which is to cover each new inventive concept therein no matter how others may later disguise it by variations in forms or additions or further improvements. The claims at the end hereof are intended as the chief aid toward this purpose; as it is these that meet the requirement of pointing out the parts, improvements, or combinations in which the inventive concepts are found.

In accordance with the present invention, the thickening action within the hopper of the digestion tank is substantially improved, so that thickened sludge is drawn from the settling tank. This is accomplished in the present case at an amazingly low cost simply by changing the form and construction of the helicoidal cross collector from that of former cross collectors. This term cross collector is derived from the fact that the screw conveyer and its hopper, which might be said to jointly form the collector, extend crosswise of the settling tank. It also distinguishes from the main or "rectangular" collector, which sweeps sludge to the hopper.

An improved method of sludge treatment is provided in this cross collector by compacting, thickening and kneading the sludge in the trough in addition to simply propelling it. This is accomplished by interrupting the spiral or helicoidal flight and producing a straight rib or flight between two helicoidal screws, preferably attached to the leading edge of the second spiral section and separate from the beginning of the first helicoidal flight. This straight flight section has a kneading action with adjacent sides of the trough which may have a close clearance therewith, or additional frictional bars may be located at the sides of the trough in such close clearance as to ensure satisfactory thickening and kneading action as the helicoidal cross collector is rotated. This action is in addition to stirring and propelling actions, and interrupted and alternate with respect to some of the actions.

Referring now more particularly to the construction shown in FIG. 1, a settling tank 10 is of common rectangular form with a depressed hopper or trough 12 extending across the sludge delivery end. A main sludge collector in the form of two endless chains 14 carrying flights or bars 16 at intervals, are usually provided, each of which extends substantially across the tank and is moved slowly along a long floor extending lengthwise to rake or sweep sludge settled in the tank by a slow movement into the hopper 12.

Each flight 16 may have wear shoes 18 at its outer edge in close proximity to the tank floor or to rails 20 of metal, or other smooth wear resisting material. The flights tend to cause thickening of the sludge by the slow movement of the flights 16 toward the hopper 12. At the opposite end of the tank 10 it is rounded at the bottom, or formed with a fillet which prevents accumulation of sludge. The chains 14 are usually driven by a shaft 21, which in turn is turned by a chain 22 connected through a reducing gear (not shown) to an electric motor (not shown) to produce a slow movement. Thus the sludge settling on the floor 23 of the tank 10 is raked or swept into the hopper 12.

Each cross collector 26 is mounted at its ends in bearings 28 in the hopper 12, and in a gear box 30 connected by a drive shaft 32 with the driving motor 24 which is preferably rotated to produce cross collector rotation at a speed of from 20 to 30 r.p.m., which is at a considerably increased rate, as compared with prior practice, producing a more compact and thickened concentration of the discharged sludge.

At the center of each cross collector 26 is a sealed, hollow core 34 preferably made of sheet metal or tubing of a relatively large diameter, of the order of eight inches, so that it has a substantial buoyant effect when installed, which strengthens and lightens the unit because of the buoyant effect in the sludge, and reduces wear on the bearings. The large diameter also tends to prevent rags and sewage string from wrapping around the core.

Projecting from the core 34 of cross collector 26 are two helicoidal blades or helix flights 36 which may extend directly outward in a radial direction, about the same distance or slightly less than the diameter of the core 34, providing an outer diameter making as close a clearance with the sides or walls of the trough or hopper 12 as is deemed practical. In turning in the hopper, these helicoidal flights 36 primarily propel the sludge, but they may act also to concentrate or thicken it to some extent.

The helix flights 36 may each comprise two complete turns or so. They are separate, independent and distinct, leaving an interrupted open space on each cross collector 26 for a radial straight paddle flight 38 alternately between two helical flights 36. This non-propelling paddle extends longitudinally of the core 34 and lies in an axial plane of core 34. This paddle flight 38 is of the same height as the helix flights 36 but it is rounded down or tapered to the core 34. The other end of the paddle flight 38 is connected to the leading edge of the downstream helix section 36. The upstream end of the other or upstream helix section 36 is also rounded down or tapered to avoid hanging up rags and strings. In other words, any exposed upstream flight ends are of "weedless" shape.

These flights are divided so that approximately 70% of the collector 26 length is equipped with helices 36, and approximately the remainder comprises a flat paddle flight 38. The paddle may overlap the trailing end of the upstream helix 36. If only one helical flight 36 is provided, it should propel the sludge through the area occupied by paddle 38. Usually, however, the collector 26 will be long enough to have at least three helical portions 36 separated by two flat paddles 38. There may even be two cores 34, each so equipped, with an intermediate bearing between them.

This paddle flight 38 section does not have a propelling action, but in conjunction with the hopper walls has a kneading and thickening action tending to squeeze water and any minute bubbles out of the sludge and to concentrate and thicken it. Side bars 40, which may also be called frictional contact plates, are placed along the walls of the hopper 12 opposite the collector 26 to provide close clearance between them and the outer edges of the helix flights 36 and the paddle flight 38 to increase the effectiveness and efficiency of their relative movements. The side faces of side bars 40 are abruptly opposed to any rotational movement of the sludge surrounding collector 26. This combination yields a surprisingly great concentrating effect.

At the end of the hopper 12 toward which collector 26 propels the sludge is a pipe 44 for drawing off the concentrated and thickened sludge.

In operation, sludge settles in the settling tank 10, as sewage or the like flows in at one end of tank 10 and effluent flows out from the other end. The settling sludge is swept or raked into the hopper 12, and at the same time may be thickened somewhat by the action thereon of the transverse flights 16. Upon delivery into the hopper 12, the partially thickened sludge is propelled, kneaded, squeezed, and thickened by the helicoidal collector which has alternate spiral and straight paddle flights to effect an efficient thickening result. Kneading with a flat paddle while under a propelling pressure from the upstream helical flight seems to be especially effective. The resultant sludge is thick enough so that in most instances no separate thickener is required, and hence there is a great saving of time and money.

Instead of letting the sludge accumulate in the hopper to be thickened by the depth of the settled sludge, or passing it through a separate sludge thickener, with danger in either case of its becoming septic due to long lack of oxygen, it can be drawn out in thickened condition as fresh sludge. This is especially important in final settling tanks, where activated sludge is settled, some of which is returned to the aeration treatment tank. Its return before its supply of dissolved oxygen is exhausted is highly desirable.

In spite of the fact that kneading blade 38 tends to retard the propulsion of the sludge, or at least contributes no propulsion, the propulsion has been found to be adequate to maintain at the outlet a body of thickened sludge, whenever enough sludge is present in hopper 12.

I claim:

1. In a sludge thickening apparatus, a rectangular settling tank with a cross trough in the bottom at one end deeper than the remainder of the tank, means for raking sludge along the bottom into the trough, the trough forming a hopper having a discharge opening at one end, and a thickener-conveyer rotatably mounted in the hopper having outer blade means fitting between the side walls of the trough, said thickener-conveyer including a helicoidal portion to propel the sludge mixture toward the discharge opening as the conveyer is rotated, and a substantially non-propelling portion between said helicoidal portion and the area of the discharge opening for kneading the propelled sludge, and a second helicoidal portion between the non-propelling portion and the discharge outlet.

2. In a sludge thickening apparatus, a rectangular settling tank with a cross trough in the bottom at one end deeper than the remainder of the tank, means for raking sludge along the bottom into the trough, the trough forming a hopper having a discharge opening at one end, and a thickener-conveyer rotatably mounted in the hopper having outer blade means fitting between the side walls of the trough, said thickener-conveyer including a helicoidal portion to propel the sludge mixture toward the discharge opening as the conveyer is rotated, and a substantially non-propelling portion between said helicoidal portion and the area of the discharge opening for kneading the propelled sludge, and a second helicoidal portion between the non-propelling portion and the discharge outlet, the leading edge of the latter helicoidal portion being directly connected to the down-stream end of the non-propelling portion and of the same diameter, to leave no string-catching leading edge.

3. In a sludge thickening apparatus, a rectangular settling tank with a cross trough in the bottom at one end deeper than the remainder of the tank, means for raking sludge along the bottom into the trough, the trough forming a hopper having a discharge opening at one end, and a thickener-conveyer rotatably mounted in the hopper having outer blade means fitting between the side walls of the trough, said thickener-conveyer including a helicoidal portion to propel the sludge mixture toward the discharge opening as the conveyer is rotated, and a substantially non-propelling portion between said helicoidal portion and the area of the discharge opening for kneading the propelled sludge, and a second helicoidal portion between the non-propelling portion and the discharge outlet, the leading edge of the latter helicoidal portion being directly connected to the down-stream end of the non-propelling portion and of the same diameter, to leave no string-catching leading edge, and the upstream end of the non-propelling portion being gently sloped from a core portion to be weedless in shape.

4. In a sludge thickening apparatus, a trough for receiving sludge and having a discharge opening therefrom, a collector rotatable in the trough about an axis lengthwise of the trough and having helical flight portions on one side of the discharge opening for propelling the sludge in one direction to the discharge opening, with a thickening flight extending in an axial plane between the helical flight portions and space from the discharge opening.

5. In a sludge thickening apparatus, a trough for receiving sludge and having a discharge opening therefrom, a collector rotatable in the trough about an axis lengthwise of the trough and having helical flight portions on one side of the discharge opening for propelling the sludge in one direction to the discharge opening, with a thickening flight extending in an axial plane between the helical flight portions and spaced from the discharge opening, said trough having a side bar extending along and adjacent to the collector.

6. A method of sludge thickening by continuous sedimentation in a rectangular tank with a deeper cross trough at one end having a sludge discharge opening leading therefrom, and raking blades movable along the tank bottom to discharge sludge into the full length of the trough, which method comprises the steps of collecting the sludge in said trough, propelling the sludge to give it movement longitudinally of the trough in the direction of the discharge opening; kneading the sludge through a substantial length of the trough and substantially without causing propulsion thereof, to thicken and concentrate the sludge, while continuing said longitudinal movement through said length toward the discharge opening, and discharging the sludge through said discharge opening.

7. A method of sludge thickening by continuous sedimentation in a rectangular tank with a deeper cross trough at one end having a sludge discharge opening leading therefrom, and raking blades movable along the tank bottom to discharge sludge into the full length of the trough, which method comprises the steps of collecting the sludge in said trough, propelling the sludge to give it movement longitudinally of the trough in the direction of the discharge opening; kneading the sludge through a substantial length of the trough and substantially without causing propulsion thereof, to thicken and concentrate the sludge, while continuing said longitudinal movement through said length toward the discharge opening, and discharging the sludge through said discharge opening;

including a further step of propelling the sludge toward the opening between said length where it is kneaded and the opening.

8. A method of sludge thickening by continuous sedimentation in a rectangular tank with a deeper cross trough at one end having a sludge discharge opening leading therefrom, and raking blades movable along the tank bottom to discharge sludge into the full length of the trough, which method comprises the steps of collecting the sludge in said trough, propelling the sludge to give it movement longitudinally of the trough in the direction of the discharge opening; kneading the sludge through a substantial length of the trough and substantially without causing propulsion thereof, to thicken and concentrate the sludge, while continuing said longitudinal movement through said length toward the discharge opening, and discharging the sludge through said discharge opening;

performing said steps by rotating about an axis in and lengthwise of said trough, at a speed of about 20 to 30 r.p.m., a blade having a helical portion followed by a portion lying substantially in an axial plane.

9. A method of sludge thickening by continuous sedimentation in a rectangular tank with a deeper cross trough at one end having a sludge discharge opening leading therefrom, and raking blades movable along the tank bottom to discharge sludge into the full length of the trough, which method comprises the steps of collecting the sludge in said trough, propelling the sludge to give it movement longitudinally of the trough in the direction of the discharge opening; kneading the sludge through a substantial length of the trough and substantially without causing propulsion thereof, to thicken and concentrate the sludge, while continuing said longitudinal movement through said length toward the discharge opening, and discharging the sludge through said discharge opening;

performing said steps by rotating about an axis in and lengthwise of said trough, at a speed of about 20 to 30 r.p.m., a blade having a helical portion followed by a portion lying substantially in an axial plane while restraining rotational movement of the sludge by a side bar extending along and adjacent the blade.

References Cited by the Examiner

UNITED STATES PATENTS

| | | | |
|---|---|---|---|
| 955,077 | 4/1910 | Janney | 210—523 |
| 960,546 | 6/1910 | Hendryx | 210—523 X |
| 1,053,172 | 2/1913 | Hendryx | 210—523 X |
| 1,184,869 | 5/1916 | Petrie | 210—524 X |
| 1,430,638 | 10/1922 | Giesler | 210—524 X |
| 1,629,701 | 5/1927 | Hass | 210—524 |
| 1,780,481 | 11/1930 | Hale. | |
| 1,991,959 | 2/1935 | Roser. | |
| 1,993,528 | 3/1935 | Roser. | |
| 2,025,722 | 12/1935 | Camp | 210—523 X |
| 2,266,764 | 12/1941 | Jordan | 198—213 |
| 2,266,945 | 12/1941 | Abraham | 198—213 X |
| 2,746,083 | 5/1956 | King | 198—213 X |
| 2,756,971 | 7/1956 | Stults | 198—213 X |
| 2,813,704 | 11/1957 | MacKissic | 259—97 X |
| 2,973,866 | 3/1961 | Genter et al. | 210—524 X |
| 3,076,637 | 2/1963 | Moziek et al. | 259—97 X |

FOREIGN PATENTS

| | | |
|---|---|---|
| 841,234 | 10/1918 | Great Britain. |
| 51,830 | 11/1932 | Norway. |
| 79,129 | 10/1918 | Switzerland. |

OTHER REFERENCES

Perry: "Chemical Engineer's Handbok," McGraw-Hill, 1950, pp. 1344–1346.

REUBEN FRIEDMAN, *Primary Examiner.*

ROBERT F. BURNETT, *Examiner.*

D. M. RIESS, D. TALBERT, JR., *Assistant Examiners.*